2,947,638
PRESERVING THE COLOR OF GROUND RED MEAT

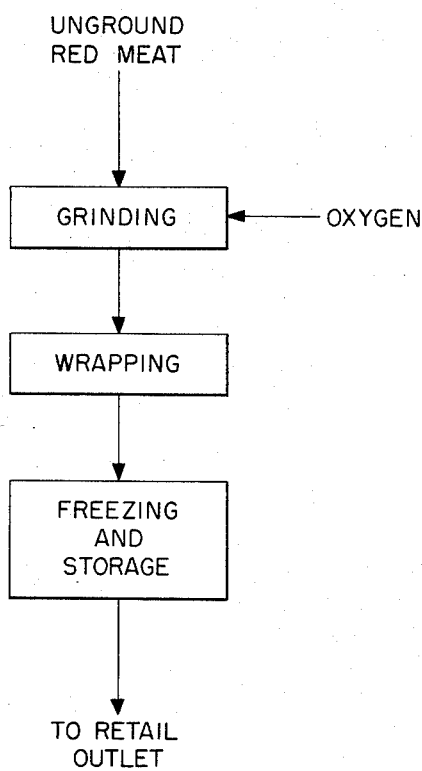

James E. Snyder and Ruby Jean Swartz, Akron, Ohio, assignors to The Goodyear Tire & Rubber Company, Akron, Ohio, a corporation of Ohio Filed June 30, 1958, Ser. No. 745,394

2 Claims. (Cl. 99—194)

This invention relates to preservation of the color of freshly ground beef and other red meats.

According to this invention, oxygen under pressure is caused to permeate the meat when freshly ground, while the cut surfaces of the meat which are exposed to the oxygen are changed. In this way, myoglobin in the freshly cut surfaces is partially oxygenated to a color between the purple of myoglobin and the red of oxymyoglobin, or it is fully oxygenated to the attractive bright red of oxymyoglobin. Air can be used, preferably oxygenated, and pure oxygen is preferred.

The meat is preferably treated in the grinder, but the treatment can be carried out in a supplementary chamber in the grinder, or in a separate piece of equipment. After treatment, the meat is wrapped and frozen.

The wrap is a transparent film, permitting the purchaser of the package to observe the color of the meat at the time of purchase. The film is preferably one that is relatively permeable to oxygen, so that oxygen from the ambient air will penetrate the wrapper and keep the surface of the meat an attractive red color. Suitable films include, for instance, rubber hydrochloride film with a plasticizer content of at least 20 parts per 100 parts of the rubber hydrochloride; regenerated cellulose coated on one side and sold as MSAT-80, MSAD-80 or MSBO cellophane; polyethylene film approximately 1.5 mil in thickness; and other commonly used wrappers for red meats.

The oxygenated meat is stored in a frozen condition until sold. While frozen, the oxygenated myoglobin appears to be stable, because the meat retains its red color. The meat is sold packaged, in a frozen condition. Each package may contain a fraction of a pound or many pounds of the ground meat. Before packaging, the oxygenated ground meat may be made into patties and then frozen, and the patties may be wrapped singly or one or more patties may be wrapped together, as desired.

To illustrate the effectiveness of the treatment, reference will be had to the accompanying drawing which is a flow sheet of an experiment which employed the procedure of this invention.

The raw meat used in the experiment was of the grade known as stewing beef. This fresh raw meat was ground at 37° F. During the grinding of one-half of the beef, oxygen was introduced into the grinder through a hole drilled near its outlet. Oxygen was supplied steadily under pressure through this hole during the grinding operation at a rate sufficient to displace most of the air from the grinder. It permeated the bulk of the ground mass while the cut surfaces of the meat exposed to the oxygen were continuously changed.

The other half of the meat was similarly ground but without introducing oxygen into the grinder.

Pure or relatively pure oxygen is more effective in the grinder than air in which the oxygen is quite dilute. If air is employed, and the treatment is carried out in the grinder, greater air flow through the grinder is maintained than is necessary with oxygen, to insure maximum oxygen supply for the freshly cut surfaces.

In the experiment, the meat from the grinder was formed to package size and exposed to the atmosphere at 37° F. for 15 minutes prior to wrapping. This "bloom" time is desirable following the oxygenation, to produce the desired bright red color on the surfaces contacting the wrapper and most apparent to the purchaser. However, the meat may be packaged immediately.

To test the effect of the oxygenation, both the meat which had been oxygenated and that which had not been oxygenated was packaged in three different grades of film at 37° F. and then stored at 0° to −20° F. A number of packages were prepared from each grade of film. Several of the stored packages were weighed periodically during the storage period to check for dehydration. There was no significant weight loss in any of the packages.

The films used for packaging were all films of rubber hydrochloride. The difference in the different grades was that they contained different amounts of plasticizer. Film A contained 10 parts of plasticizer; film B, 22.5 parts; and film C, 30 parts. It is known that the greater the plasticizer content of a film, the more permeable the film is to the transmission of oxygen.

After seven months of storage the meat was color-rated in the frozen state. Also after thawing, both the surface and the interior of each package of the thawed meat were color-rated. The ratings were numerical and had the following significance:

1.0=Excellent color, bright red.
2.0=Salable, not so red.
3.0=Dark, unsalable.

Everything rated 2.0 and below resembled the color of freshly cut meat sufficiently to be attractive to the purchaser. The other meat which was rated 2.1 to 3.0 was perfectly good, but its color was less attractive than that with a lower rating.

The results of the test are recorded in the following table which differentiates between the meats packaged in the different films and between meat which had been oxygenated and that which had not been oxygenated. Only the surfaces of the frozen packages were rated.

| Film | Treatment | Frozen (Surface) | Thawed | |
|---|---|---|---|---|
| | | | Surface | Inside |
| A | None | 2.1 | 2.3 | 2.1 |
| A | Oxygenated | 2.0 | 2.2 | 1.7 |
| B | None | 1.9 | 1.8 | 2.1 |
| B | Oxygenated | 1.6 | 1.6 | 1.7 |
| C | None | 1.7 | 1.6 | 2.0 |
| C | Oxygenated | 1.5 | 1.5 | 1.7 |

The results show that the meat which had been oxygenated during grinding had a better color after storage than that which had not been oxygenated. It not only had a better color after storage and while still frozen, but after thawing, both the surface and the inside of the meat had a better color because of having been oxygenated. In all of these tests, the oxygenated meat had a better color than that which had not been oxygenated. That wrapped in the most highly plasticized film had the best red color after storage, and that which had been oxygenated was much better than that which had not been oxygenated.

The intensity of the oxygenation treatment may be varied. The greater the oxygen content of the gases within the grinder and the greater the area of the freshly cut surfaces exposed to the gases, the shorter the time required to produce the desired effect. The wrapper is preferably highly permeable to oxygen although wraps of relatively low permeability may be used.

Although the experiment relates to the treatment of ground beef, other red meats, such as cube steaks, etc.

which have been partially macerated may be similarly treated to preserve their red color.

The procedure described herein has advantages over packaging in either an evacuated thin can, or a tin can in which the air, after filling, has been replaced by oxygen.

The invention is covered in the claims which follow.

What we claim is:

1. The method of preserving the red color of a mass of ground beef which comprises exposing the freshly ground meat to oxygen under pressure greater than atmospheric while changing the cut surfaces of the meat exposed to the oxygen, packaging the resulting oxygenated ground beef in transparent film, and then freezing and storing the package at freezing temperature.

2. The method of preserving the red color of a mass of ground beef which comprises grinding the meat in a stream of air under greater than atmospheric pressure and thereby oxygenating the freshly cut surfaces of the meat, packaging the resulting oxygenated ground beef in transparent film, and then freezing and storing the package at freezing temperature.

References Cited in the file of this patent

UNITED STATES PATENTS

| | | |
|---|---|---|
| 2,521,579 | Hopkins et al. | Sept. 5, 1950 |
| 2,681,279 | Sloan et al. | June 15, 1954 |
| 2,847,313 | Ellies | Aug. 12, 1958 |